US009806429B2

(12) United States Patent
Wilbur

(10) Patent No.: US 9,806,429 B2
(45) Date of Patent: Oct. 31, 2017

(54) WIRELESS SIGNAL ENHANCER

(71) Applicant: John Russell Wilbur, San Jose, CA (US)

(72) Inventor: John Russell Wilbur, San Jose, CA (US)

( * ) Notice: Subject to any disclaimer, the term of this patent is extended or adjusted under 35 U.S.C. 154(b) by 173 days.

(21) Appl. No.: 14/204,296

(22) Filed: Mar. 11, 2014

(65) Prior Publication Data

US 2014/0300511 A1 Oct. 9, 2014

Related U.S. Application Data

(60) Provisional application No. 61/785,181, filed on Mar. 14, 2013.

(51) Int. Cl.

*G01S 1/00* (2006.01)
*H01Q 19/12* (2006.01)
*H01Q 3/02* (2006.01)
*H01Q 15/16* (2006.01)
*H01Q 1/12* (2006.01)

(52) U.S. Cl.

CPC ............... *H01Q 19/12* (2013.01); *H01Q 3/02* (2013.01); *H01Q 1/1207* (2013.01); *H01Q 15/16* (2013.01)

(58) Field of Classification Search

CPC .......... H01Q 15/16; H01Q 3/02; H01Q 19/12; H01Q 1/1207
USPC .......................................................... 342/350
See application file for complete search history.

(56) References Cited

U.S. PATENT DOCUMENTS 5,440,801 A * 8/1995 Marks ...................... H01Q 1/38 29/419.1
5,826,201 A * 10/1998 Gratias .................. H01Q 1/245 343/702
5,949,370 A * 9/1999 Smith .................... H01Q 1/288 342/354
6,023,242 A * 2/2000 Dixon .................... H01Q 1/125 342/359
6,208,300 B1 * 3/2001 Johnson ................. H01Q 1/245 343/702
6,771,229 B2 * 8/2004 Thornburgh ........... H01Q 1/288 342/10
6,977,624 B1 * 12/2005 Szente ..................... H01Q 3/04 342/8
7,333,771 B2 * 2/2008 Maxwell .............. H01Q 1/1242 361/807
2003/0020667 A1 * 1/2003 Essig, Jr. ................ E04H 15/20 343/832
2005/0026655 A1 * 2/2005 Giaimo, III .......... H01Q 19/104 455/557
2012/0229358 A1 * 9/2012 Doneker ................ H01Q 1/526 343/848
2015/0094104 A1 * 4/2015 Wilmhoff .............. H01Q 1/241 455/457

* cited by examiner

*Primary Examiner* — Chuong P Nguyen

(57) ABSTRACT

A signal enhancer has a framework, a concave reflector having an axis of reflection, joined to the framework in a manner that direction of the axis of the reflector may be varied, and a support a cellular telephone joined to the axis in a manner that a cellular telephone may be placed and held in the support at different distances from the reflector along the axis of the reflector.

5 Claims, 3 Drawing Sheets

WIRELESS SIGNAL ENHANCER

CROSS-REFERENCE TO RELATED APPLICATIONS

The present application claims priority to a Provisional Patent Application 61/785,181, filed on Mar. 14, 2013. All disclosure of the prior application is incorporated herein at least by reference.

BACKGROUND OF THE INVENTION

1. Field of the Invention

The present invention is in the technical field of wireless transmission, and pertains more particularly to signal enhancement.

2. Description of Related Art

It is well known in the art that cellular wireless systems rely on base stations that cover a limited geographic area, and that a cellular telephone needs to be within the reach of a base station to be able to place, receive or conduct a call. Coverage in any cellular system is not universal, and cell phones are well-known to have an ability to display signal strength.

In some circumstances signal strength may be a life-or-death matter. There are many instances where a person or a family have gotten lost in an area with poor or no cellular coverage, and have died as a result of not being able to call for help.

What is clearly needed is a way to enhance a very poor cellular signal to a better signal, strong enough to enable a person with a cellular telephone to make or receive a call.

BRIEF SUMMARY OF THE INVENTION

In one embodiment of the invention a signal enhancer is provided comprising a framework, a concave reflector having an axis of reflection, joined to the framework in a manner that direction of the axis of the reflector may be varied, and a support for a cellular telephone joined to the axis in a manner that a cellular telephone may be placed and held in the support at different distances from the reflector along the axis of the reflector. Reflectors may be of different sizes. Some reflectors may be parabolas. The support for the telephone may have notches at different positions to hold the telephone.

DETAILED DESCRIPTION OF THE INVENTION

Figure 1:
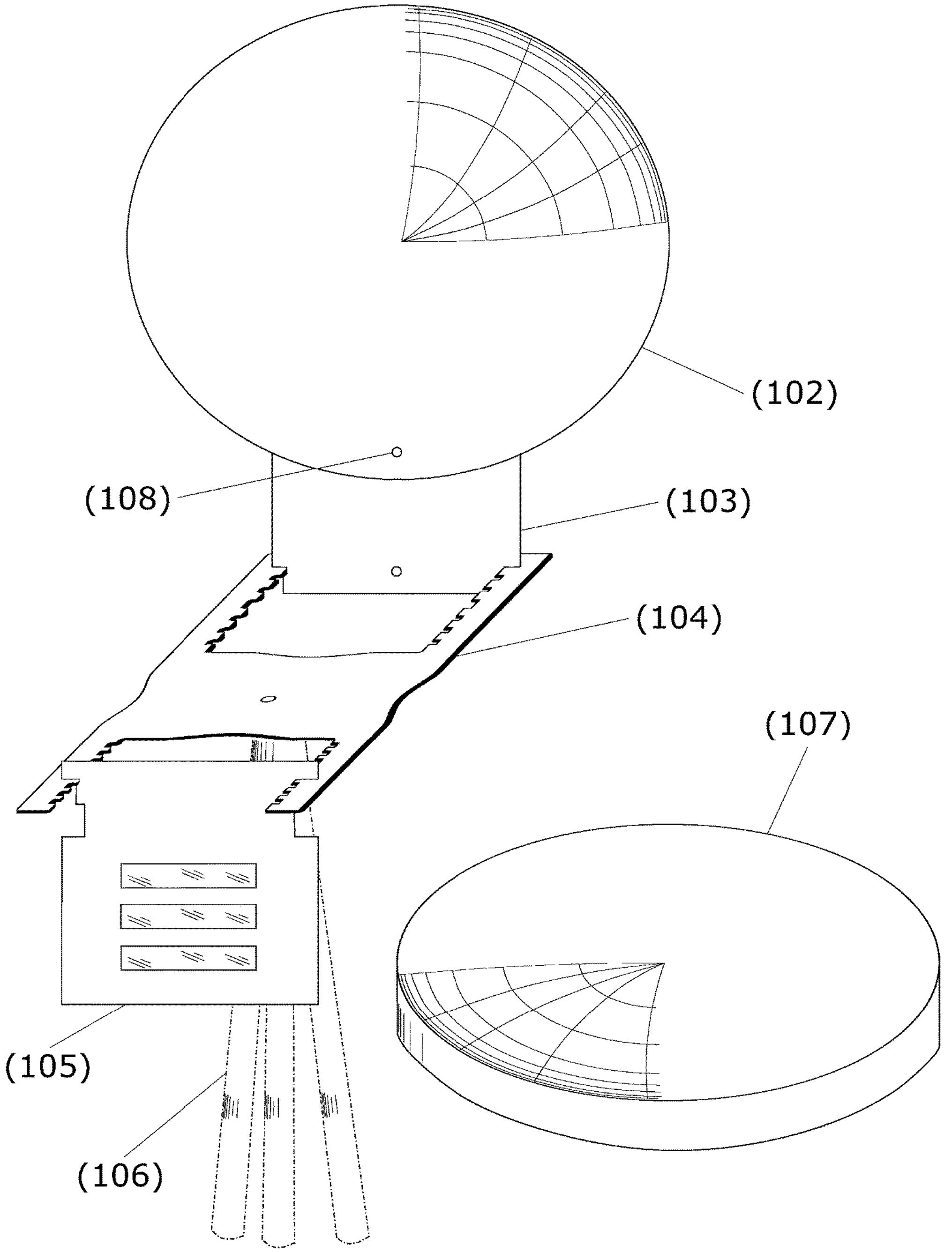
FIG. 1 is a perspective view of a wireless signal enhancer in one embodiment of the present invention.

FIG. 1 is an illustration of a wireless signal enhancer 101 according to an embodiment of the present invention. In this embodiment there is a parabolic reflector disc 102, one purpose of which is to concentrate a microwave cell phone signal toward the focal point of the parabola. The parabolic reflector chosen can either have a center focus or offset from center focus. In this embodiment an offset from center focus was chosen. In some embodiments it is not necessary that the reflector be parabolic. It is required for the invention that the reflector reflect incoming signals in a manner that the reflected signal is more concentrated than the incoming signal.

Figure 2:
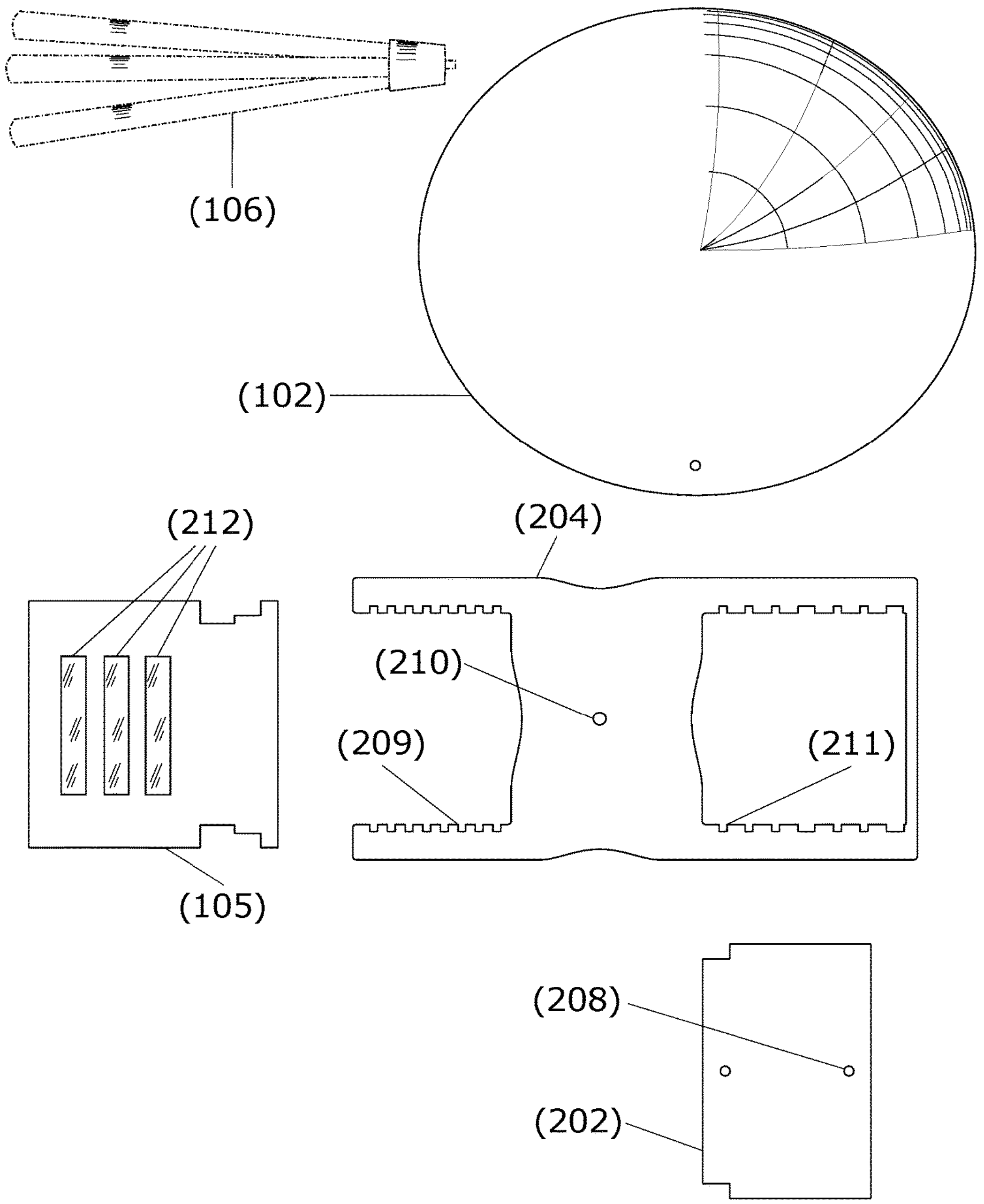
FIG. 2 is an exploded plan view showing parts of the signal enhancer of FIG. 1.
Figure 3:
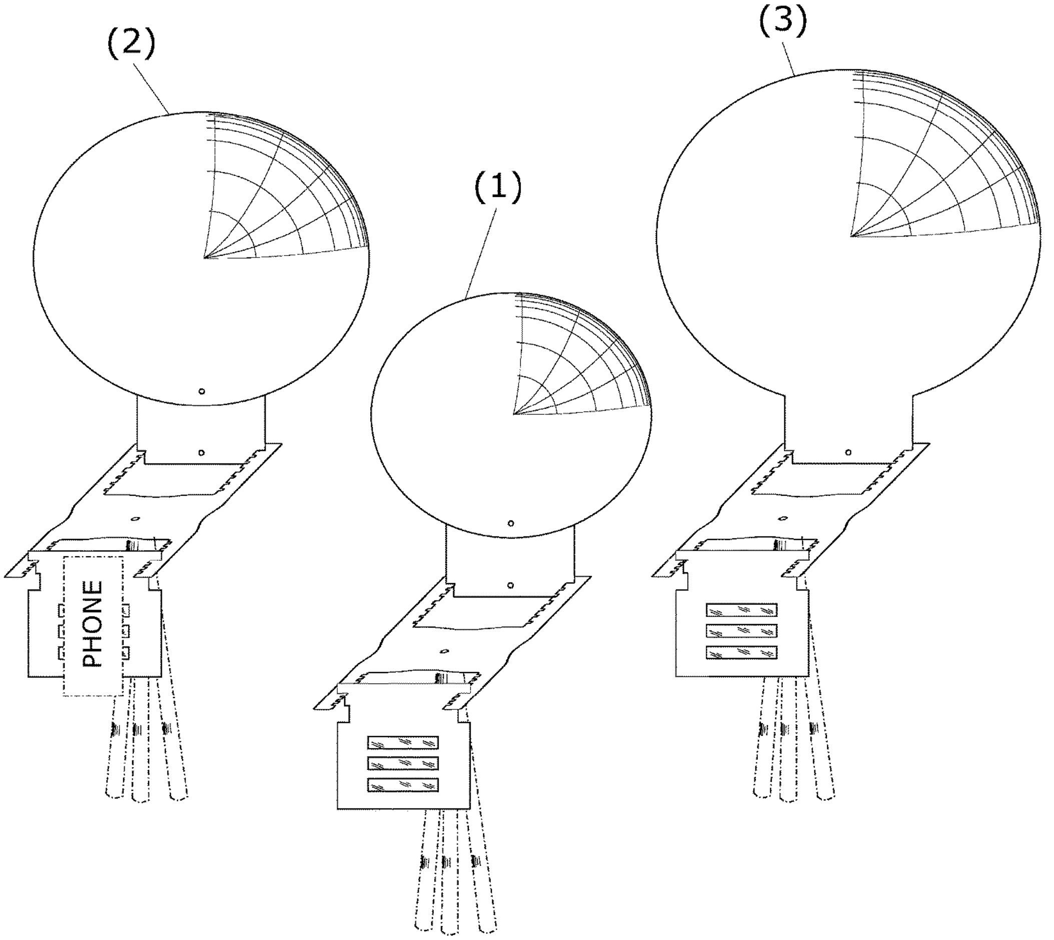
FIG. 3 is an elevation view of different enhancers in embodiments of the invention.

In the embodiment shown in FIG. 1 parabolic reflector dish 102 may be attached to a disc holder 103 by means of a tapped screw 108 or other conventional fastener, or the reflector dish and holder may be fabricated as a one piece assembly, as seen in FIG. 3 (3), which shows a large reflecting disk. Disc holder 103 may be attached to a bridge assembly 104 by lowering it into a disc holder position notch 211 shown in FIG. 2. Likewise the cell phone holder 105 is able to be positioned using cell phone holder position notches 209 (FIG. 2). In this embodiment, this combination of assemblies determines the relative position of parabolic reflector disc 102 to cell phone holder 105.

A cell phone in this embodiment may be attached to cell phone holder 105 using Velcro™ type tape 212, or by any one of a number of methods, such as by wrapping a rubber band around the cell phone and cell phone holder, gluing them together, or using a universal or model-specific cell phone case as part of the cell phone holder, for example. Cell phones come in varied sizes and have their internal antennas located at varied positions, usually near the top rear part of the cell phone. Signal enhancement may be obtained by positioning the internal cell phone antenna along the path of the signal on its way from the parabolic reflector disc 102 to a location near its focal point. The cell phone can be attached to cell phone holder 105 at a height near the focal point that maximizes signal strength, as in FIG. 3 (2). Cell phone holder 105 may then be attached to bridge assembly 104 at the signal-maximizing position using appropriate notch 209. Adjacent cell phone holder position notches 209, closer and further away from the parabolic disc, can then be tested to verify the best location for maximum signal strength. Another type of cell phone holder 105 may be used that slides on the bridge assembly 104, closer to and farther from the parabolic reflecting disc 102.

Parabolic reflector disc 102 may be fashioned from any number of materials such as plastic, steel, aluminum, wood, iron, or carbon fiber, for example, depending in part on intended uses and cost factors. One such method would be to make a wood, aluminum, or steel mold of the desired parabolic shape, vacuum form acrylic plastic, and then apply a conductive coating that will reflect microwaves. Plastic injection molding, a metal machine press, a stamping press, or other methods may also be used. In this embodiment, a wood mold 107 was fabricated and used to vacuum form ⅛ inch thick acrylic plastic. A number of other plastics may be used such as PETG or HIPS, depending at least in part on intended uses, environmental and cost factors. Then a conductive spray may be applied. Other methods of applying conductive coatings may be used, for example application of an adhesive backed conductive metal film on the disc surface or application of adhesive on metal tape or foil followed by lamination of the tape or foil to the parabolic disc. Disc holder 103 and cell phone holder 105 were fabricated from ⅛ inch thick acrylic plastic and laser cut to the desired shape. The thicknesses of any material used may be selected to achieve desired stiffness, rigidity, or other desired properties. Similarly, in this embodiment the bridge assembly 104 shape was fabricated from ¼ inch thick acrylic and trimmed with a laser cutter. For a larger reflecting disk, ⅜ inch thick acrylic plastic was chosen in this embodiment for its rigidity. In this embodiment a ¼ inch×20 threads per inch tripod mounting hole 210 in the bridge assembly 204 was also cut with a laser and then tapped. In this embodiment a hole was cut with a laser in the disc holder 202 and then tapped to allow for a mounting screw in the tapped hole 208. In this embodiment, this mounting screw goes through a hole that was cut with a laser in the parabolic reflector disc 102. In this embodiment, Velcro tape 212 was applied to the cell phone holder 105 to allow the affixing of the cell phone. Other methods for cutting the shapes desired may be used, such as a band or scroll saw and a drill press to cut holes. In this embodiment, a tripod 106 was attached to the bridge assembly. In another embodiment, the wireless signal enhancer may be attached to a bracket or another structure.

The embodiments described above have been tested using many cell phones, but the same signal enhancement can benefit any similar receiver or transmitter device in the microwave ranges, without the need for any direct hardwire connection to the device's antenna.

It will be apparent to a skilled artisan that the embodiments described above are exemplary of inventions that may have greater scope than any of the singular descriptions. There may be many alterations made in these examples without departing from the spirit and scope of the invention. For example, different signal enhancers may have different size reflecting discs or be made of a different thickness or have stiffening perimeter support or stiffening ribs, or be a different subsection cut from a paraboloid, but still achieve the same end result, which is an amplified signal strength concentrated on its way toward the focal point. Bridge assemblies, disc holders, and cell phone holders may look and be constructed differently, but achieve the same end result of maintaining the relative position difference between the reflector and the cell phone. These and many other features may change in different embodiments.

The invention claimed is:

1. A wireless signal enhancer comprising:

a. a parabolic dish shaped reflector comprising a conductive surface to focus an incident electromagnetic signal onto an internal antenna of a cellphone receiver or transmitter device in the microwave range;

b. means for maintaining user adjustable relative position and orientation, of said cellphone device in the microwave range, with respect to the focal point of said reflector, whereby the signal strength of said cellphone device in the microwave range is increased without requiring a wired connection to the device;

c. wherein the means for maintaining user adjustable relative position and orientation comprises a bridge assembly holding said reflector and said cellphone receiver or transmitter at user adjustable relative position and orientation that increase the signal strength of the device.

2. The wireless signal enhancer of claim 1 wherein said reflector is made from a polymeric material and a conductive layer.

3. The wireless signal enhancer of claim 1 wherein said reflector is made from aluminum.

4. The wireless signal enhancer of claim 1 wherein said reflector is made from a steel material and a conductive layer.

5. The wireless signal enhancer of claim 1 wherein said reflector is made from carbon fiber and a conductive layer.

* * * * *